(12) United States Patent
Roberge

(10) Patent No.: US 12,611,699 B2
(45) Date of Patent: Apr. 28, 2026

(54) SYSTEM AND METHOD FOR AN AGRICULTURAL HARVESTER

(71) Applicant: CNH Industrial Canada, Ltd., Saskatoon (CA)

(72) Inventor: Martin J. Roberge, Québec City (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 552 days.

(21) Appl. No.: 18/109,158

(22) Filed: Feb. 13, 2023

(65) Prior Publication Data
US 2024/0269710 A1 Aug. 15, 2024

(51) Int. Cl.
| | |
|---|---|
| B07B 9/02 | (2006.01) |
| A01D 41/12 | (2006.01) |
| A01D 45/10 | (2006.01) |

(52) U.S. Cl.
CPC ................ B07B 9/02 (2013.01); A01D 41/12 (2013.01); A01D 45/10 (2013.01)

(58) Field of Classification Search
CPC ............ B07B 9/02; A01D 41/12; A01D 45/10
See application file for complete search history.

(56) References Cited

U.S. PATENT DOCUMENTS

| | | | |
|---|---|---|---|
| 3,608,597 A | 9/1971 | Hill | |
| 3,946,875 A | 3/1976 | Fowler | |
| 4,039,434 A | 8/1977 | Croucher | |
| 8,216,035 B2 | 7/2012 | Ravineau et al. | |
| 9,976,567 B2 | 5/2018 | Junior et al. | |
| 2004/0074217 A1* | 4/2004 | Reaux | A01D 45/00 56/51 |
| 2019/0082600 A1* | 3/2019 | Nicora | B07B 4/02 |
| 2019/0082605 A1* | 3/2019 | Sechinato | B08B 5/023 |
| 2022/0232768 A1* | 7/2022 | Craig | A01D 41/1276 |

FOREIGN PATENT DOCUMENTS

WO 2WO 010/072809 A1 7/2010

* cited by examiner

*Primary Examiner* — Claude J Brown
(74) *Attorney, Agent, or Firm* — Dority & Manning, P.A.

(57) ABSTRACT

A debris removal system for an agricultural harvester can include an extractor housing defining a housing inlet, a housing outlet, and a passage. The extractor housing can further define an airflow channel for directing debris through the extractor housing from the housing inlet to the housing outlet. An airflow device can be configured to generate an airflow from the housing inlet towards the airflow device. The airflow can be configured to separate the debris billets of a crop material. A drum can be positioned at least partially within the airflow channel and between the housing inlet and the passage. The debris within the airflow channel can be directed by the drum toward the housing outlet.

18 Claims, 15 Drawing Sheets

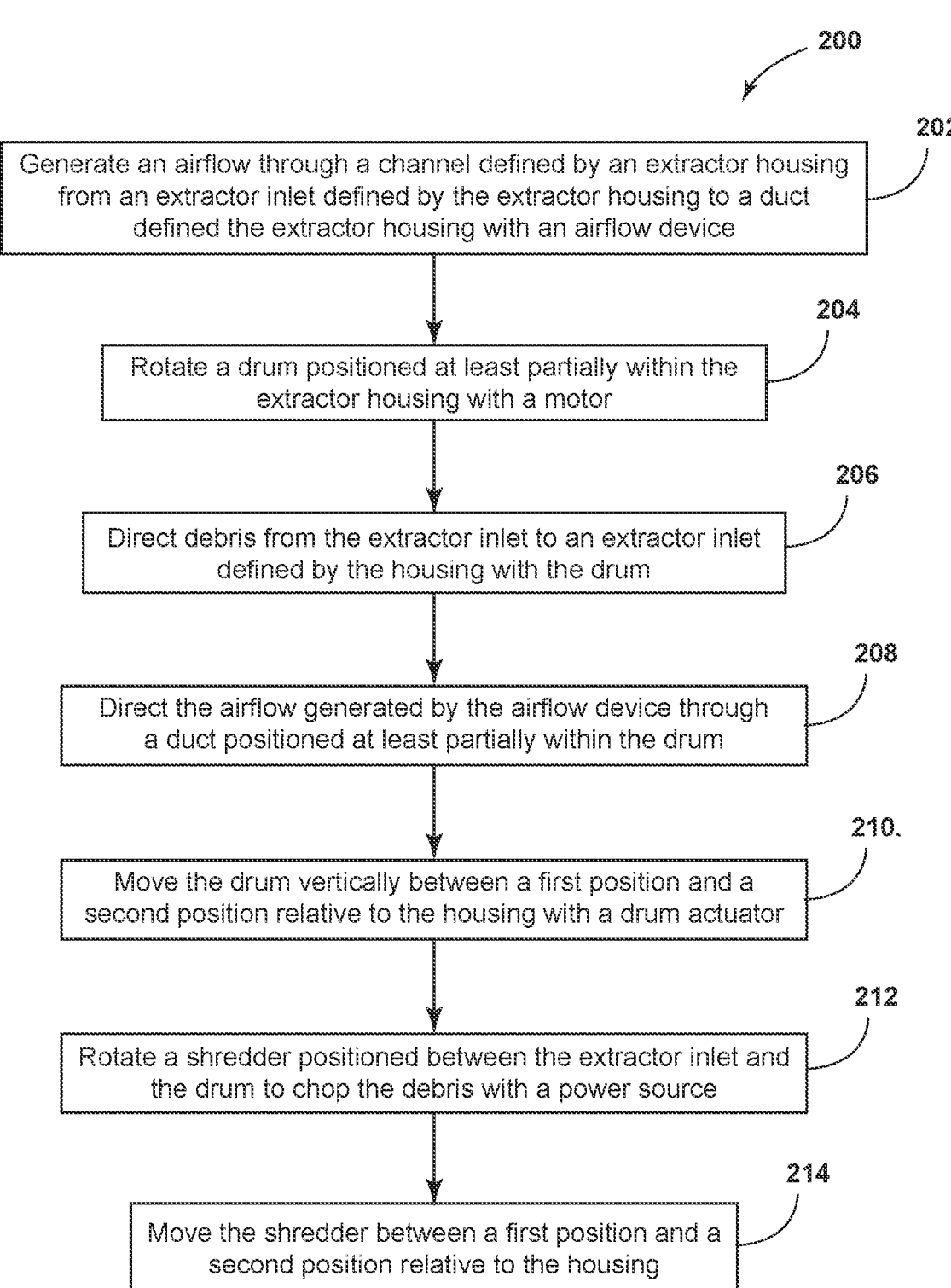

200

202
Generate an airflow through a channel defined by an extractor housing from an extractor inlet defined by the extractor housing to a duct defined the extractor housing with an airflow device 204
Rotate a drum positioned at least partially within the extractor housing with a motor 206
Direct debris from the extractor inlet to an extractor inlet defined by the housing with the drum 208
Direct the airflow generated by the airflow device through a duct positioned at least partially within the drum 210.
Move the drum vertically between a first position and a second position relative to the housing with a drum actuator 212
Rotate a shredder positioned between the extractor inlet and the drum to chop the debris with a power source 214
Move the shredder between a first position and a second position relative to the housing

FIG. 13

SYSTEM AND METHOD FOR AN AGRICULTURAL HARVESTER

FIELD OF THE INVENTION

The present disclosure relates generally to agricultural harvesters, such as sugarcane harvesters, and, more particularly, to systems and methods for the agricultural harvester.

BACKGROUND OF THE INVENTION

Agricultural harvesters can include an assembly of processing equipment for processing harvested crop materials. For instance, within a sugarcane harvester, severed sugarcane stalks are conveyed via a feed roller assembly to a chopper assembly that cuts or chops the sugarcane stalks into pieces or billets (e.g., six-inch cane sections). The processed crop material discharged from the chopper assembly is then directed as a stream of billets and debris into a debris removal system, within which the airborne debris (e.g., dust, dirt, leaves, etc.) is separated from the sugar billets. The separated/cleaned billets then fall into an elevator assembly for delivery to an external storage device.

Accordingly, systems and methods for separating the stream of billets and the debris that address one or more issues associated with existing systems/methods would be welcomed in the technology.

BRIEF DESCRIPTION OF THE INVENTION

Aspects and advantages of the invention will be set forth in part in the following description, or may be obvious from the description, or may be learned through practice of the invention.

In some aspects, the present subject matter is directed to a debris removal system for an agricultural harvester. The debris removal system includes an extractor housing defining a housing inlet, a housing outlet, and a passage. The extractor housing further defines an airflow channel for directing debris through the extractor housing from the housing inlet to the housing outlet. An airflow device is configured to generate an airflow from the housing inlet towards the airflow device and the airflow is configured to separate the debris from billets of a crop material. A drum is positioned at least partially within the airflow channel and between the housing inlet and the passage. The debris within the airflow channel is directed by the drum toward the housing outlet.

In some aspects, the present subject matter is directed to a method for operating a debris removal system for an agricultural harvester. The agricultural harvester includes a material processing system configured to receive a flow of harvested materials. The method includes generating, with an airflow device, an airflow through a channel defined by an extractor housing from a housing inlet defined by the extractor housing to a passage defined by the extractor housing. The method also includes rotating, with a motor, a drum positioned at least partially within the extractor housing. Lastly, the method includes directing, with the drum, debris from the housing inlet to a housing outlet defined by the housing.

In some aspects, the present subject matter is directed to a debris removal system for an agricultural harvester. The debris removal system includes an extractor housing defining a housing inlet, a housing outlet, and a passage. The extractor housing further defines an airflow channel for directing debris through the extractor housing from the housing inlet to the housing outlet. An airflow device is configured to generate an airflow from the housing inlet towards the airflow device and the airflow is configured to separate the debris from billets of a crop material. A drum is positioned at least partially within the airflow channel and between the housing inlet and the passage. The debris within the airflow channel is directed by the drum toward the housing outlet. An actuator is operably coupled with the drum and configured to move the drum vertically between a first position and a second position relative to the housing.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 13 illustrates a flow diagram of a method for operating a debris removal system for an agricultural harvester in accordance with aspects of the present subject matter.

Figure 1:
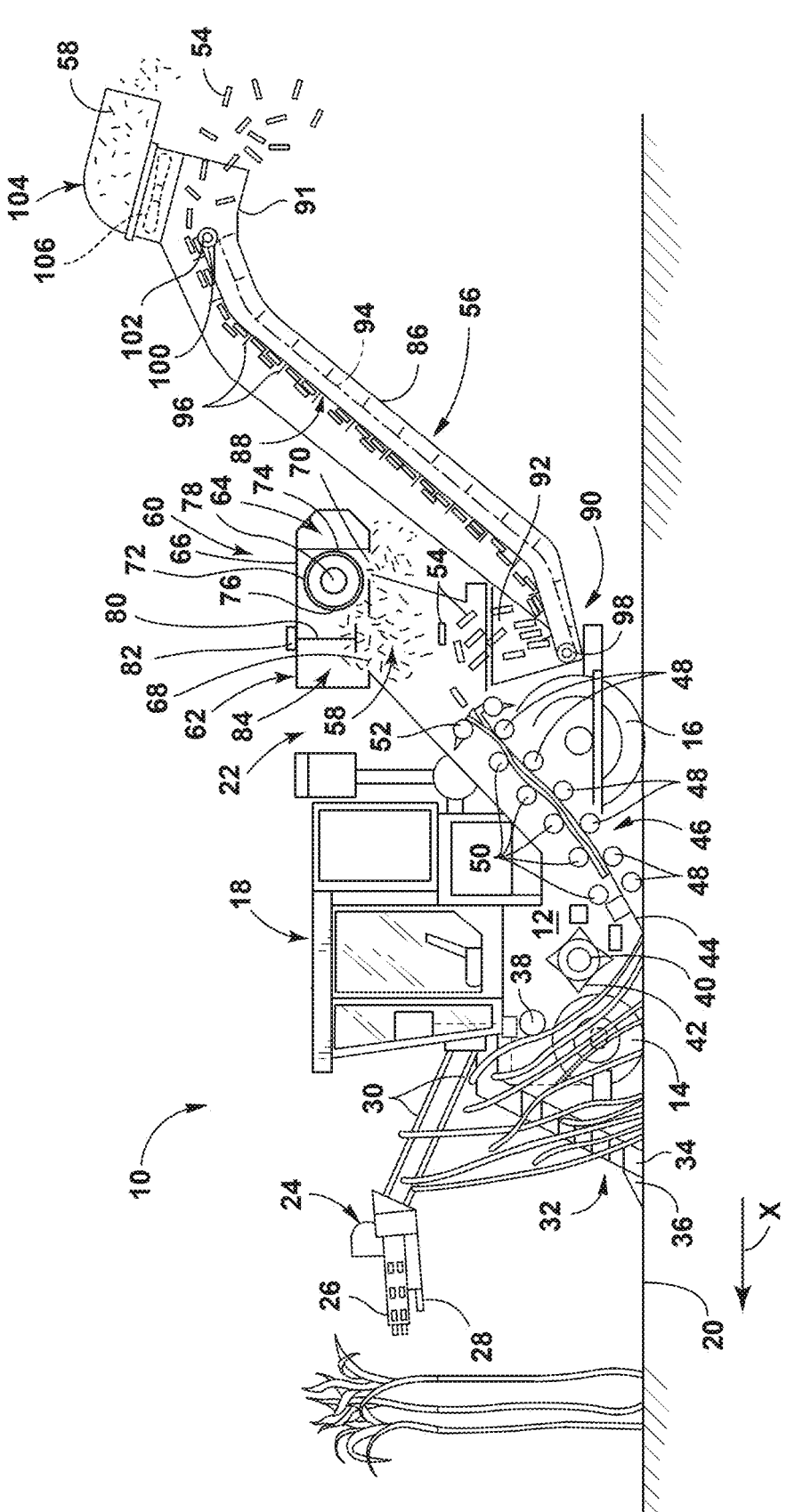
FIG. 1 illustrates a simplified, side view of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a crop within a fluid circuit. For example, "upstream" refers to the direction from which a crop flows, and "downstream" refers to the direction to which the crop moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality.

Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination; A and C in combination: B and C in combination: or A, B, and C in combination.

In general, the present subject matter is directed to systems and methods for a debris removal system for an agricultural harvester. The debris removal system can include a primary extractor that is configured to direct the debris outwardly from the harvester.

In various examples, the debris removal system can include an extractor housing defining a housing inlet, a housing outlet, and a passage. The extractor housing can further define an airflow channel for directing debris through the extractor housing from the housing inlet to the housing outlet. An airflow device can be configured to generate an airflow from the housing inlet towards the airflow device. The airflow can be configured to separate the debris billets of a crop material.

A drum may be positioned at least partially within the airflow channel and positioned between the housing inlet and the passage. The debris within the airflow channel is directed by the drum toward the housing outlet. As such, the airflow device may be free of contact with the debris, and/or contact with the airflow device with the debris may be reduced thereby increasing the lifespan of the components within the debris removal system.

Referring now to the drawings, FIG. 1 illustrates a side view of an agricultural harvester 10 in accordance with aspects of the present subject matter. As shown, the harvester 10 is configured as a sugarcane harvester. However, in other embodiments, the harvester 10 may correspond to any other suitable agricultural harvester without departing from the teachings provided herein.

As shown in FIG. 1, the harvester 10 includes a frame 12, a pair of front wheels 14, a pair of rear wheels 16, and an operator's cab 18. The harvester 10 may also include a source of power (e.g., an engine mounted on the frame 12) that powers one or both pairs of the wheels 14, 16 via a transmission through an agricultural field 20. Alternatively, the harvester 10 may be a track-driven harvester and, thus, may include tracks driven by the source of power as opposed to the illustrated wheels 14, 16. The source of power may also drive a hydraulic fluid pump configured to generate pressurized hydraulic fluid for powering various hydraulic components of the harvester 10.

The harvester 10 may also include a material processing system 22 incorporating various components, assemblies, and/or sub-assemblies of the harvester 10 for cutting, processing, cleaning, and discharging sugarcane as the cane is harvested from the agricultural field 20. For instance, the material processing system 22 may include a topper assembly 24 positioned at the front end portion of the harvester 10 to intercept sugarcane as the harvester 10 is moved in the forward direction. As shown, the topper assembly 24 may include a gathering disk 26 and/or a cutting disk 28. The gathering disk 26 may be configured to gather the sugarcane stalks so that the cutting disk 28 may be used to cut off the top of each stalk. In some cases, the height of the topper assembly 24 may be adjustable via a pair of arms 30 hydraulically raised and lowered, as desired, by the operator.

The material processing system 22 may further include a crop divider 32 that extends upwardly and rearwardly from the field 20. In general, the crop divider 32 may include two spiral feed rollers 34. Each feed roller 34 may include a ground shoe 36 at its lower end portion to assist the crop divider 32 in gathering the sugarcane stalks for harvesting. Moreover, as shown in FIG. 1, the material processing system 22 may include a knock-down roller 38 positioned near the front wheels 14 and a fin roller 40 positioned behind the knock-down roller 38. As the knock-down roller 38 is rotated, the sugarcane stalks being harvested are knocked down while the crop divider 32 gathers the stalks from agricultural field 20. Further, as shown in FIG. 1, the fin roller 40 may include a plurality of intermittently mounted fins 42 that assist in forcing the sugarcane stalks downwardly. As the fin roller 40 is rotated during the harvest, the sugarcane stalks that have been knocked down by the knock-down roller 38 are separated and further knocked down by the fin roller 40 as the harvester 10 continues to be moved in the forward direction relative to the field 20.

Referring still to FIG. 1, the material processing system 22 of the harvester 10 may also include a base cutter assembly 44 positioned behind the fin roller 40. In various examples, the base cutter assembly 44 may include blades for severing the sugarcane stalks as the cane is being harvested. The blades, located on the peripheral portion of the base cutter assembly 44, may be rotated by a hydraulic motor powered by the vehicle's hydraulic system. Additionally, in several embodiments, the blades may be angled downwardly to sever the base of the sugarcane as the cane is knocked down by the fin roller 40.

Moreover, the material processing system 22 may include a feed roller assembly 46 located downstream of the base cutter assembly 44 for moving the severed stalks of sugarcane from base cutter assembly 44 along the processing path of the material processing system 22. As shown in FIG. 1, the feed roller assembly 46 may include a plurality of bottom rollers 48 and a plurality of opposed, top rollers 50. The various bottom and top rollers 48, 50 may be used to pinch the harvested sugarcane during transport. As the sugarcane is transported through the feed roller assembly 46, debris (e.g., rocks, dirt, and/or the like) may be allowed to fall through bottom rollers 48 onto the field 20.

The material processing system 22 may further include a chopper assembly 52 located at the downstream end portion of the feed roller assembly 46 (e.g., adjacent to the rearward-most bottom and top rollers 48, 50). In general, the chopper assembly 52 may be used to cut or chop the severed sugarcane stalks into pieces or "billets" 54, which may be, for example, six (6) inches long. The billets 54 may then be propelled towards an elevator assembly 56 of the material processing system 22 for delivery to an external receiver or storage device.

The pieces of debris 58 (e.g., dust, dirt, leaves, etc.) separated from the sugar billets 54 may be expelled from the harvester 10 through a debris removal system 60 of the material processing system 22 that can include a primary extractor 62, which is located downstream of the chopper assembly 52 and is oriented to direct the debris 58 outwardly from the harvester 10. Additionally, an airflow device 64 is mounted within a housing 66 of the primary extractor 62. The airflow device 64 may be configured to generate a suction force or vacuum to force the debris 58 through a housing inlet 68 and one or more housing outlets 70 defined by the housing 66. In some examples, a drum 72 may be positioned within the housing 66. The drum 72 may be positioned between the airflow device 64 and the housing inlet 68. In some cases, the drum 72 can include a suction segment 74 and a deflector 76. A motor 78 may be operably coupled with the drum 72 and configured to rotate the drum 72.

In some cases, a material shredder 80 can be located at or near the housing inlet 68. In various examples, the material shredder 80 may be driven using a power source 82, such as an electric or hydraulic motor. During the operation of the primary extractor 62, the airflow device 64 draws the debris 58 toward the housing inlet 68, and the optional material shredder 80 shreds and chops the debris 58 into smaller pieces. In turn, the debris 58 is drawn towards the drum 72 by the suction force or vacuum of the airflow device 64 to force the debris 58 to contact and rotate with the drum 72. As the drum 72 rotates, the debris 58 may be transferred from an airflow channel 84 defined by the housing 66 toward the one or more housing outlets 70. Due to the solid portion of the drum 72, the debris 58 may be released through the housing outlet 70 to be exhausted from the extractor 62.

The separated or cleaned billets 54, heavier than the debris 58 being expelled through the extractor 62, may then be directed to the elevator assembly 56. As shown in FIG. 1, the elevator assembly 56 may include an elevator housing 86 and an elevator 88 extending within the elevator housing 86 between a lower, proximal end portion 90 and an upper, distal end portion 92. In general, the elevator 88 may include a looped chain 94 and a plurality of flights or paddles 96 attached to and evenly spaced on the chain 94. The paddles 96 may be configured to hold the sugar billets 54 on the elevator 88 as the billets 54 are elevated along a top span of the elevator 88 defined between its proximal and distal end portions 90, 92. Additionally, the elevator 88 may include lower and upper sprockets 98, 100 positioned at its proximal and distal end portions 90, 92, respectively. As shown in FIG. 1, an elevator motor 102 may be coupled to one of the sprockets (e.g., the upper sprocket 100) for driving the chain 94, thereby allowing the chain 94 and the paddles 96 to travel in a loop between the proximal and distal end portions 90, 92 of the elevator 88.

Moreover, in some embodiments, the pieces of debris 58 (e.g., dust, dirt, leaves, etc.) separated from the elevated sugar billets 54 may be expelled from the harvester 10 through a secondary extractor 104 of the debris removal system 60 coupled to the rear end portion of the elevator housing 86. For example, the debris 58 is expelled by the secondary extractor 104 remaining after the billets 54 are cleaned and debris 58 is expelled by the primary extractor 62. As shown in FIG. 1, the secondary extractor 104 may be located adjacent to the distal end portion 92 of the elevator 88 and may be oriented to direct the debris 58 outwardly from the harvester 10. In various examples, the secondary extractor 104 may include any of the components described with reference to the primary extractor 62. Additionally or alternatively, an extractor fan 106 may be mounted at the base of the secondary extractor 104 for generating a suction force or vacuum sufficient to force the debris 58 through the secondary extractor 104. The separated, cleaned billets 54, heavier than the debris 58 expelled through the extractor 104, may then fall from the distal end portion 92 of the elevator 88. In some examples, the billets 54 may be directed into an elevator discharge opening 91 of the elevator assembly 56 into an external storage device, such as a sugar billet cart.

During operation, the harvester 10 is traversed across the agricultural field 20 for harvesting sugarcane. After the height of the topper assembly 24 is adjusted via the arms 30, the gathering disk 26 on the topper assembly 24 may function to gather the sugarcane stalks as the harvester 10 proceeds across the field 20, while the cutter disk 28 severs the leafy tops of the sugarcane stalks for disposal along either side of harvester 10. As the stalks enter the crop divider 32, the ground shoes 36 may set the operating width to determine the quantity of sugarcane entering the throat of the harvester 10. The spiral feed rollers 34 then gather the stalks into the throat to allow the knock-down roller 38 to bend the stalks downwardly in conjunction with the action of the fin roller 40. Once the stalks are angled downward as shown in FIG. 1, the base cutter assembly 44 may then sever the base of the stalks from field 20. The severed stalks are then, by the movement of the harvester 10, directed to the feed roller assembly 46.

The severed sugarcane stalks are conveyed rearwardly by the bottom and top rollers 48, 50, which compress the stalks, make them more uniform, and shake loose debris 58 to pass through the bottom rollers 48 to the field 20. At the downstream end portion of the feed roller assembly 46, the chopper assembly 52 cuts or chops the compressed sugarcane stalks into pieces or billets 54 (e.g., six-inch cane sections). The processed crop material discharged from the chopper assembly 52 is then directed as a stream of billets 54 and debris 58 into the primary extractor 62. The airborne debris 58 (e.g., dust, dirt, leaves, etc.) separated from the billets 54 is then extracted through the primary extractor 62 using suction created by the airflow device 64. The separated/cleaned billets 54 are then directed into an elevator hopper 92 into the elevator assembly 56 and travel upwardly via the elevator 88 from its proximal end portion 90 to its distal end portion 92. During normal operation, once the billets 54 reach the distal end portion 92 of the elevator 88, the billets 54 fall through the elevator discharge opening 91 to an external storage device. If provided, the secondary extractor 104 (with the aid of the extractor fan 106) blows out trash/debris 58 from harvester 10, similar to the primary extractor 62.

Figure 2:
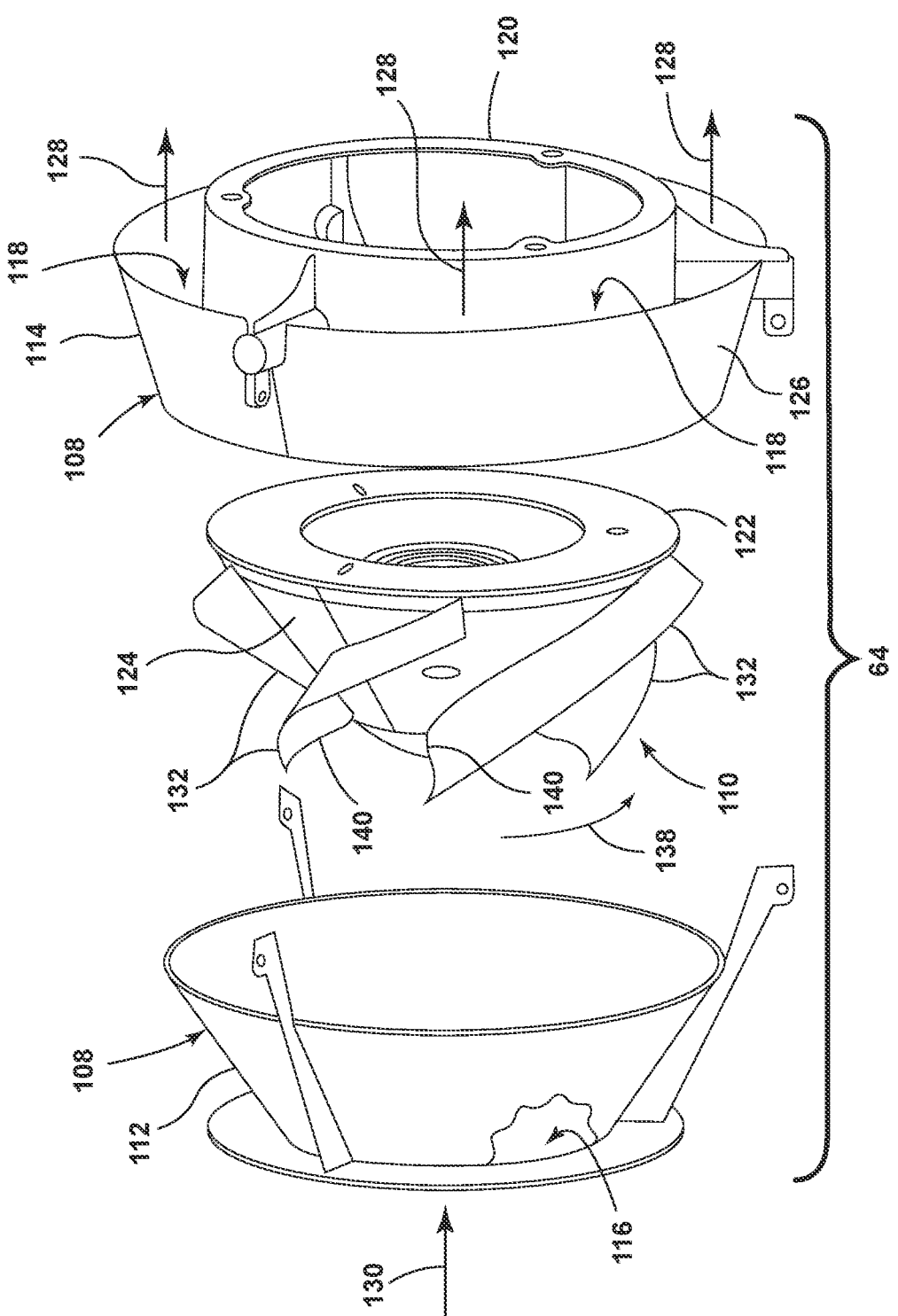
FIG. 2 is an exploded perspective view of an airflow device of a debris removal system in accordance with aspects of the present subject matter.
Figure 3:
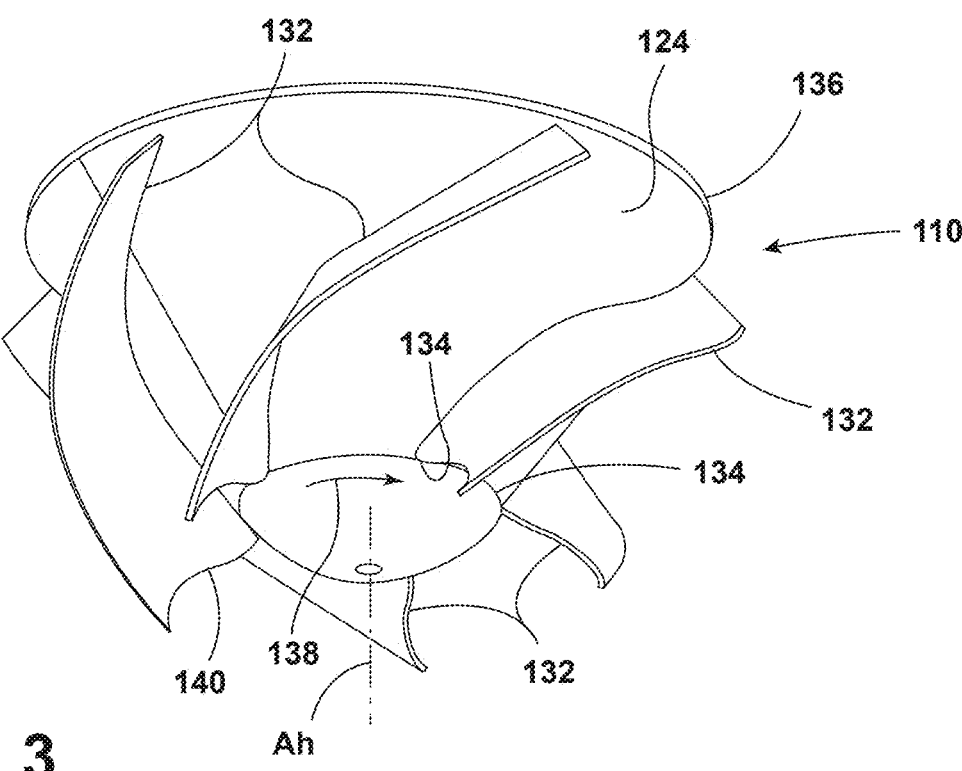
FIG. 3 is a perspective view of the rotor shown in FIG. 2 in accordance with aspects of the present subject matter.

Referring now to FIG. 2, the airflow device 64 can include an outer casing 108 and a rotor 110. The casing 108, in some examples, may be constructed as a two-piece housing allowing the rotor 110 to be placed therein, including an inlet casing portion 112 and an outlet casing portion 114. The inlet casing portion 112 can include a casing inlet 116 (partially visible with part of the casing portion 112 fragmented away in FIG. 2) allowing air within the housing 66 (and possibly the debris 58) to be drawn axially towards the rotor 110. The outlet casing portion 114 can include a casing outlet 118 to allow the discharge of the air within the housing 66 (and possibly the debris 58). In the illustrated example, the outlet casing portion 114 includes an inner housing part 120 which lies closely adjacent to the outlet end portion 122 of a hub 124 of the rotor 110, and an outer housing part 126 which, may be concentric with the inner annular housing part 120 and defines the casing outlet 118. The flow direction 128 of the air from the casing outlet 118 can be generally parallel (or at least partially directed in a common direction) to the flow direction 130 of the air entering the casing inlet 116 to the inlet casing portion 112.

Referring to FIGS. 2-5, in some examples, the airflow device 64 may be configured as a mixed flow fan, combining the high-volume flow characteristics of an axial fan with the increased pressure delivery characteristics of a centrifugal fan. The rotor 110 provides the airflow device 64 with the mixed flow characteristics and can include the hub 124 and a plurality of blades 132. The hub 124 can have a smaller diameter inlet end portion 134 and a larger diameter outlet end portion 122. Each of the blades 132 can be attached to the hub 124 and can curves from the inlet end portion 134 toward the outlet end portion 122, relative to a direction of rotation 138 of the rotor 110, whereby air is blown during operation both axially and radially. This combination of axial and radial forces on the air passing through the rotor blades 132 can maintain a high flow rate, increasing the air dynamic pressure while decreasing the static pressure at the outlet of the airflow device 64, with quiet operating performance.

With further reference to FIGS. 2-5, each of the blades 132 of airflow device 64 can have a proximal end portion 140 attached to the hub 124 at or near the inlet end portion 134, and each of the blades 132 can terminate at or near the outlet end portion 122 of the hub 124. The blades 132 curve in a radial manner toward the outlet end portion 122. In the illustrated examples, each of the blades 132 curves as a continuous curve. However, it may also be possible to form the blades 132 with a plurality of adjoining discrete linear segments which generally define a curve, such as shown on the one blade with dashed lines 132A illustrating 4 adjoining linear segments in FIG. 5.

Figure 4:
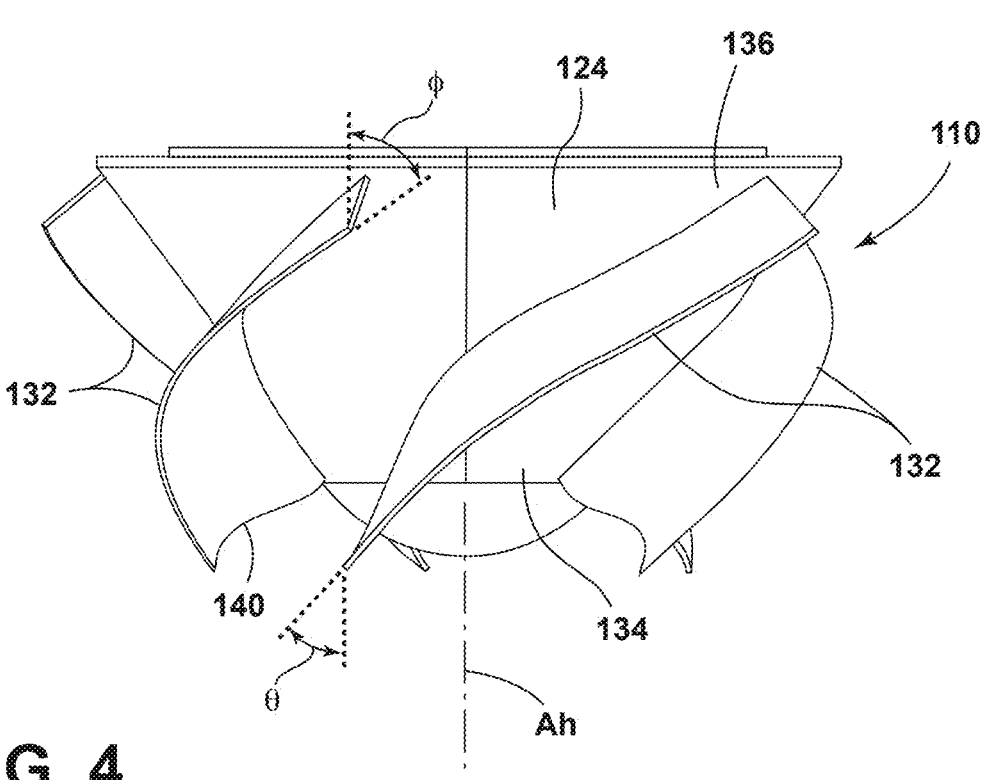
FIG. 4 is a side view of the rotor shown in FIG. 2 in accordance with aspects of the present subject matter.
Figure 5:
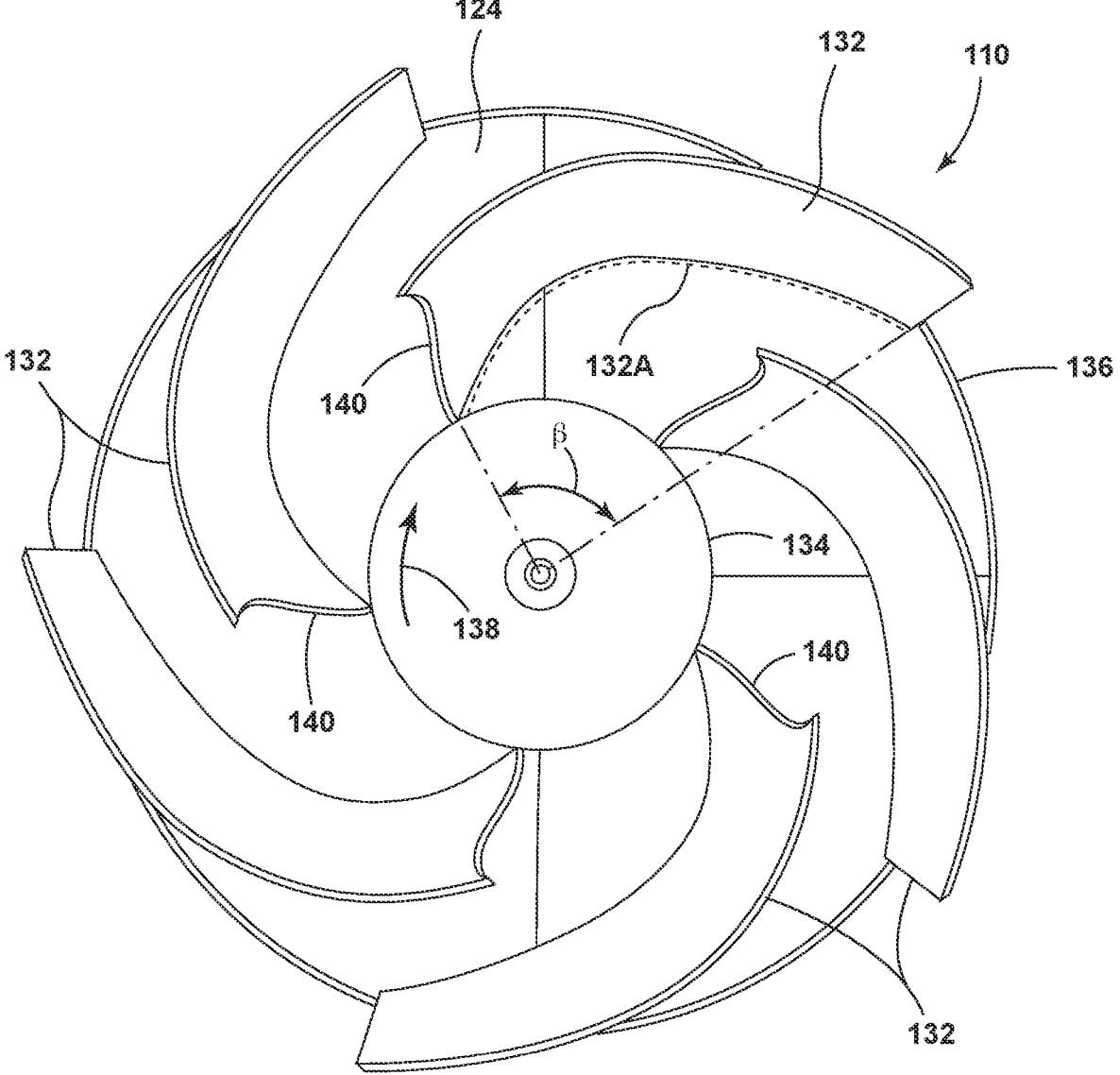
FIG. 5 is a plan view of the rotor shown in FIG. 3 in accordance with aspects of the present subject matter.

In various examples, each of the blades 132 can rotate through an angle β of between approximately 75° to 90° of rotation, measured on a radial coordinate system and viewed parallel to the axis of rotation of the hub Ah (as illustrated in FIG. 5). Moreover, each of the blades 132 has an inlet angle θ of between approximately 40° to 50°, and an outlet angle Φ of between approximately 40° to 55°, relative to and viewed orthogonal to the axis of rotation of the hub Ah (as illustrated in FIG. 4).

Figure 6:
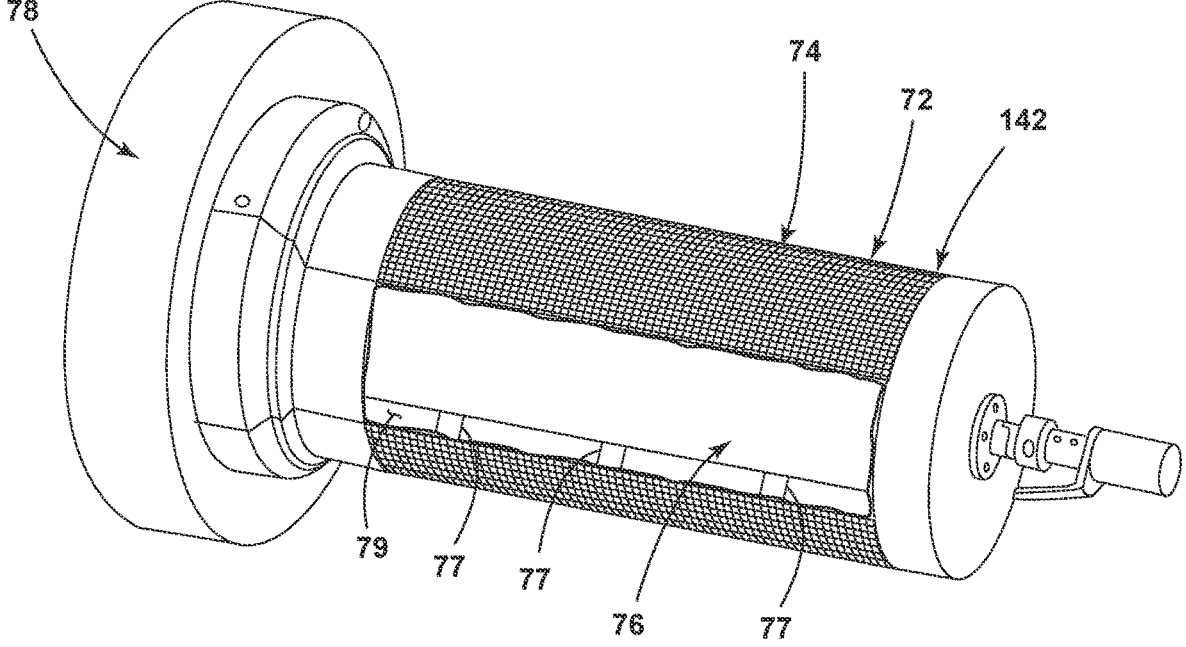
FIG. 6 is a perspective view of a drum of the debris removal system in accordance with aspects of the present subject matter.

Referring to FIG. 6, the drum 72 may be operably coupled with a motor 78 for rotating the drum 72 about a rotational axis. In some examples, the motor 78 may be configured as an electric motor, a hydraulic motor, and/or any other practicable device.

As illustrated, a deflector 76 may be positioned at least partially within the drum. In various examples, the deflector 76 can define a duct 77. Additionally or alternatively, the deflector 76 may define an opening 79 and a duct 77 may be operably coupled with the deflector 76 and encompass at least a portion of the opening 79. In operation, the duct 77 can define an airflow channel 84 that may be configured to direct a path of the airflow therethrough. In some cases, the duct 77 may include one or more vanes 81 that may be configured to distribute the airflow through the duct 77 to various sections thereof, which may in turn assists in avoiding preferential flow (e.g., may assist in reducing the nearest section of the duct 77 to the airflow device 64 from having the greatest suction and so on).

With further reference to FIG. 6, in various examples, perforations in an outer wall 142 of the drum 72 form a suction segment 74. To this end, the perforations in the drum 72 can be adapted to allow the suction airflow to pass through. In such instances, the debris 58 (FIG. 1) can be sanctioned to the suction segment 74 and rotated by the drum 72. When a portion of the drum 72 is not aligned with the duct 77 along the flow path of the air suctioned air generated by the airflow device 64, the suction force may be reduced thereby releasing the debris 58 (FIG. 1) from the drum 72, which in turn, may fall through the housing outlet 70 (FIG. 1).

Referring now to FIGS. 7A-12, schematic views of some examples of a debris removal system 60 installed relative to the primary extractor 62 of the harvester 10 are illustrated in accordance with aspects of the present subject matter. It will be appreciated that, in general, the system 60 described herein may be utilized to replace one or more components (e.g., the airflow device 64) of the primary extractor 62 and/or one or more components (e.g., the extractor fan 106) of the secondary extractor 104 of a harvester 10. Thus, although the illustrated examples of the disclosed system 60 will generally be described herein with reference to the primary extractor 62, the system 60 may also be installed in an operative associated with the secondary extractor 104.

In the examples illustrated in FIGS. 7A-12, the elevator assembly 56 may be positioned in a harvesting position in which the elevator assembly 56 is non-parallel to the direction of travel X (FIG. 1) in the fore-aft direction F-A. As such, the debris removal system 60 may be configured to direct debris 58 rearwardly of the elevator assembly 56, at least a portion of the elevator assembly, and/or the hopper 92. Moreover, in some instances, the drum 72 within the debris removal system 60 may be positioned rearwardly of the elevator assembly 56, at least a portion of the elevator assembly, and/or the hopper 92.

In various examples, the debris removal system 60 can include a computing system 144 operably coupled with the primary extractor 62. In general, the computing system 144 may be configured as any suitable processor-based device, such as a computing device or any suitable combination of computing devices. Thus, in several embodiments, the computing system 144 may include one or more processors 146 and associated memory 148 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 148 of the computing system 144 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 148 may generally be configured to store information accessible to the processor 146, including data that can be retrieved, manipulated, created, and/or stored by the processor 146 and instructions that can be executed by the processor 146, when implemented by the processor 146, configure the computing system 144 to perform various computer-implemented functions, such as one or more aspects of the image processing algorithms and/or related methods described herein. In addition, the computing system 144 may also include various other suitable components, such as a communications circuit or module, one or more input/output channels, a data/control bus, and/or the like.

In various embodiments, the computing system 144 may correspond to an existing controller of the harvester 10, or the computing system 144 may correspond to a separate processing device. For instance, in some embodiments, the computing system 144 may form all or part of a separate plug-in module or computing device that is installed relative to the harvester 10 to allow for the debris system 60 and related methods to be implemented without requiring additional software to be uploaded onto existing control devices of the harvester 10. Further, the various functions of the computing system 144 may be performed by a single processor-based device or may be distributed across any number of processor-based devices, in which instance such devices may be considered to form part of the computing system 144. For instance, the functions of the computing system 144 may be distributed across multiple application-specific controllers.

With further reference to FIGS. 7A-8C, in various examples, the debris system 60 may include an extractor, such as the primary extractor 62. As shown, the extractor 62 may include the extractor housing 66 defining the housing inlet 68 and a housing outlet 70. As illustrated in FIGS. 7A-8C, the housing inlet 68 and the housing outlet 70 can be positioned vertically below at least a portion of the drum 72 along a vertical V direction that is perpendicular to a fore-aft direction F-A. The housing 66 may further define a duct 150 to direct airflow generated by the airflow device 64 therethrough. In some examples, the duct 150 can be positioned vertically above at least a portion of the drum 72.

As shown in FIGS. 7A-8C, the extractor housing 66 may include an exterior housing wall 152 that defines an airflow channel 84 between the housing inlet 68 and housing outlet 70 for directing the debris 58 through the housing 66 for subsequent discharge from the extractor 62 via the housing outlet 70. As shown in FIGS. 7A-8C, the extractor housing 66 may include a first section 154 extending upwardly from the housing inlet 68 and an associated second section 156 extending from the first section 154. The second section 156 may be positioned about an upper portion of the drum 72 (when the drum 72 is at least partially positioned within the housing 66) and/or support the airflow device 64. In operation, the airflow device 64 may generate a suction or vacuum through the housing 66 thereby creating an airflow path, as generally indicated by arrows 158. As such, the debris 58 directed through the extractor housing 66 may flow upwardly from the housing inlet 68 through the airflow channel 84 defined by the first section 154 of the housing 66 and contact the drum 72. The drum 72, which may be rotated by the motor 78 in the direction of arrow 160, may direct the debris 58 to a position proximate to the housing outlet 70, such as rearwardly and/or laterally offset from at least a portion of the elevator assembly 56. In various examples, an angle between the housing inlet 68 and the housing outlet 70 is less than 180 degrees relative to an axis of rotation of the drum 72. When the debris 58 that is moved by the drum 72 is not aligned along the flow path with the duct, the debris may be released from the drum 72 and discharged from the harvester 10 through the housing outlet 70. In some cases, the airflow device 64 may have a varied speed to further release debris 58 from the drum 72 based on a detected buildup thereon from one or more sensors and/or at defined intervals.

Figure 7A:
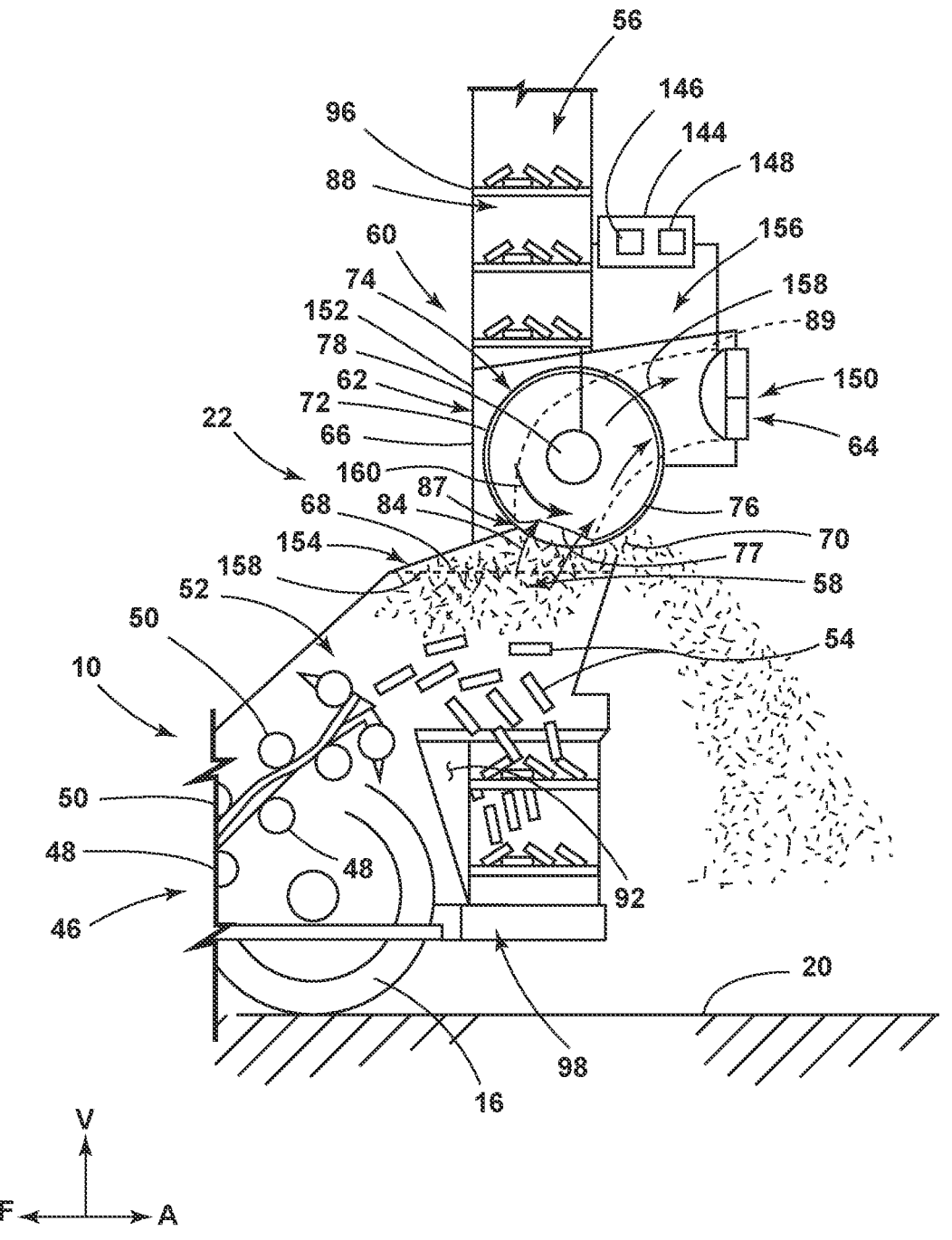
FIG. 7A is a schematic view of the debris removal system incorporated within a primary extractor in accordance with aspects of the present subject matter.
Figure 8A:
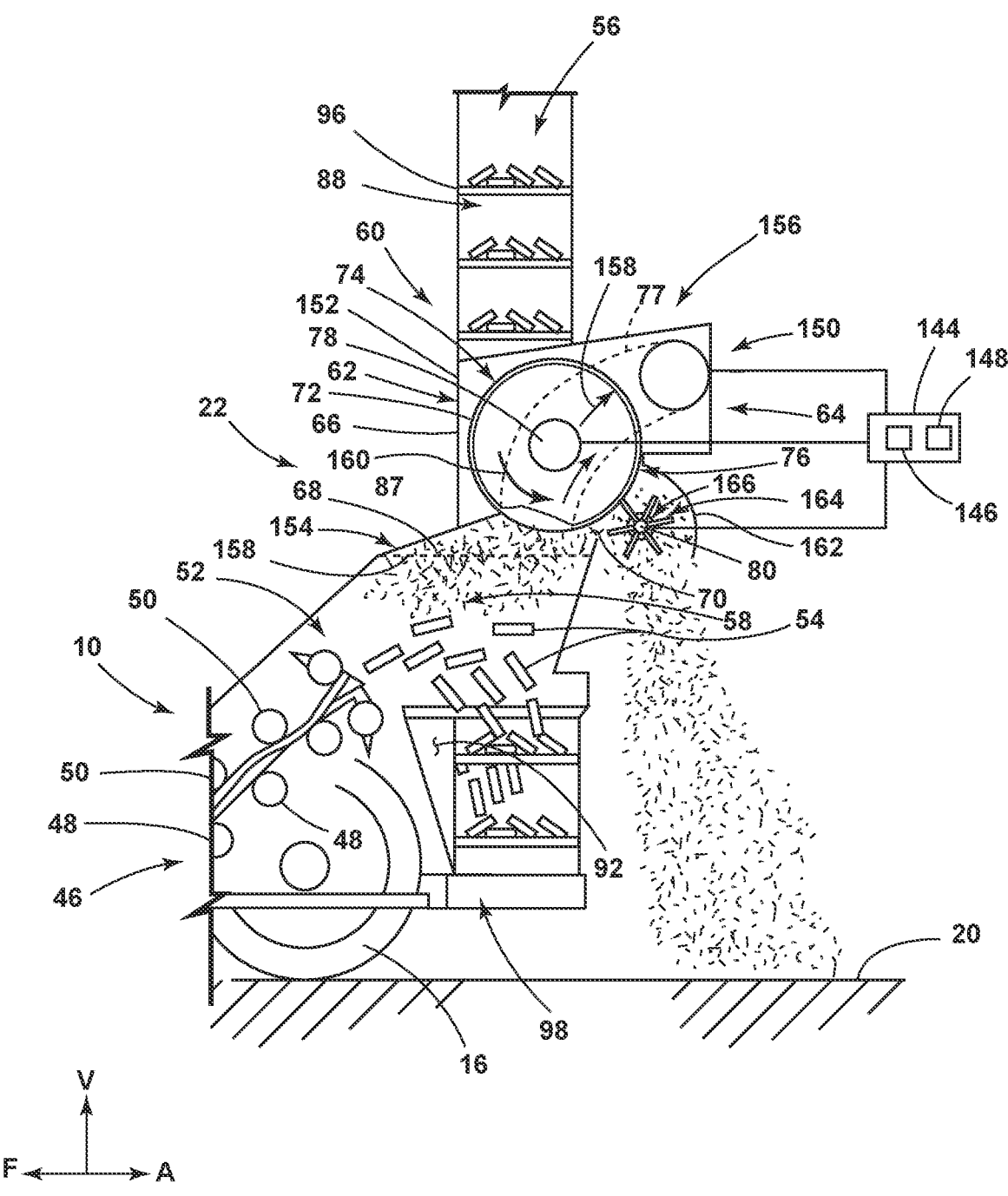
FIG. 8A is a schematic view of the debris removal system incorporated within a primary extractor in accordance with aspects of the present subject matter.

Referring further to FIGS. 7A and 8A, the duct may be positioned at least partially forward of the housing outlet in a vehicle fore-aft direction. In such instances, the offset may reduce the amount of environmental air that is suctioned through the duct 77. Moreover, a seal 87 may be positioned between various components of the debris removal system 60. For example, the seal 87 may be positioned between a side portion of the duct 77 that is opposite to the opening 70 and the housing 66. Additionally or alternatively, the seal 87 may be positioned between the drum 72 and the housing 66. Additionally or alternatively, the seal 87 may be positioned between the deflector 76 and the drum 72 and/or the housing 66.

Figure 7B:
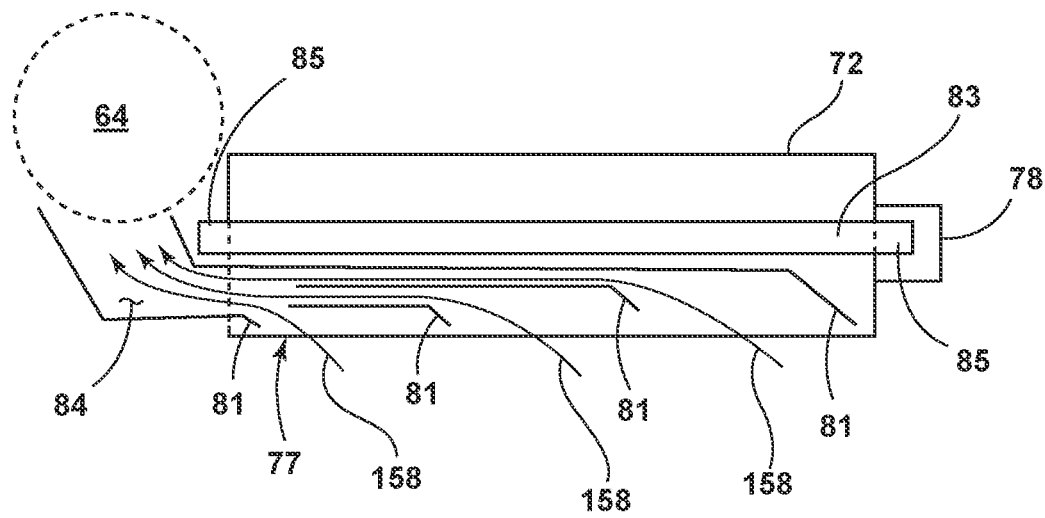
FIG. 7B is a cross-section view taken along the line VIIB-VIIB of FIG. 7A.

With further reference to FIG. 7B, a motor 78 may be operably coupled with the drum 72 and configured to rotate the drum 72 about an axle 83. In some cases, opposing end portions of the axle may be operably coupled with bearings 85 to support the rotation of the axle 83.

As provided herein, the duct 77 can define an airflow channel 84 that may be configured to direct a path of the airflow therethrough. In some cases, the duct 77 may include one or more vanes 81 that may be configured to distribute the airflow through the duct 77 to various sections thereof, which may in turn assists in avoiding preferential flow (e.g., may assist in reducing the nearest section of the duct 77 to the airflow device 64 from having the greatest suction and so on).

Figure 8B:
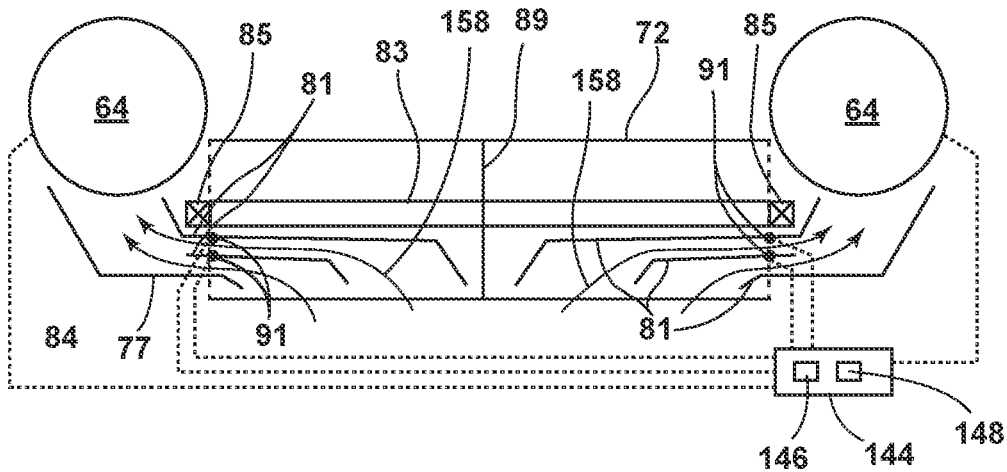
FIG. 8B is a cross-section view taken along the line VIIIB-VIIIB of FIG. 8A.
Figure 8C:
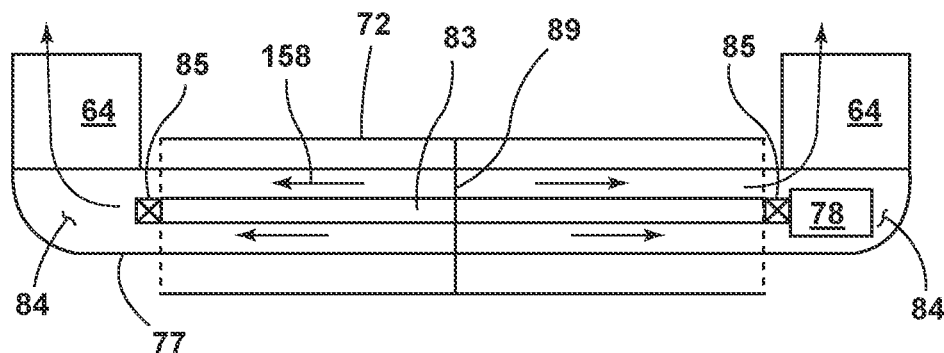
FIG. 8C is a cross-section view taken along the line VIIIB-VIIIB of FIG. 8A.

With further reference to FIGS. 8A-8C, the first section 154 of the housing 66 may further include a deflector section 162 and/or a debris processing assembly 164 downstream of the drum 72. The debris processing assembly 164 may be a shredder 80 that is configured to further shred and/or chop the debris 58 into smaller pieces. Additionally, the debris processing assembly 164 may operate as a spreader that is configured to direct the debris 58 exhausted through the housing outlet 70 to cover a defined area around the harvester 10 as the debris 58 is exhausted therefrom. In several examples, the debris processing assembly 164 can include a power source 166, such as an electric or hydraulic motor, for driving the shredder 80 and/or the spreader.

In some instances, such as the examples illustrated in FIGS. 8A-8C, the debris removal system 60 may include a pair of airflow devices 64. In such instances, each airflow device 64 may be fluidly coupled with a respective passage 150 of the housing 66.

Referring further to FIG. 8B, the drum 72 may define perforations in an outer wall 142 thereof to form a suction segment 74. To this end, the perforations in the drum 72 can be adapted to allow the suction airflow to pass through. Moreover, the drum 72 may further include a frame 89 that may be positioned within the drum 72.

In some examples, the vanes 81 within the duct 77 may be actuatable to alter an amount of airflow through various portions of the duct 77. For instance, an end portion of one or more vanes 81 may be rotatable about a pivot point 91 to alter the airflow 158 through the one or more portions. It will be appreciated that, in other examples, the vanes 81 may be collapsible, slidable, or otherwise movable in addition to or alternatively to being pivotable without departing from the teachings provided herein.

With further reference to FIG. 8C, in some cases, the duct 77 may be coaxial with the drum 72. Moreover, each of the airflow devices 64 may be configured to have an adjustable airflow based on a detected amount of debris 58 within the debris removal system 60.

Figure 9A:
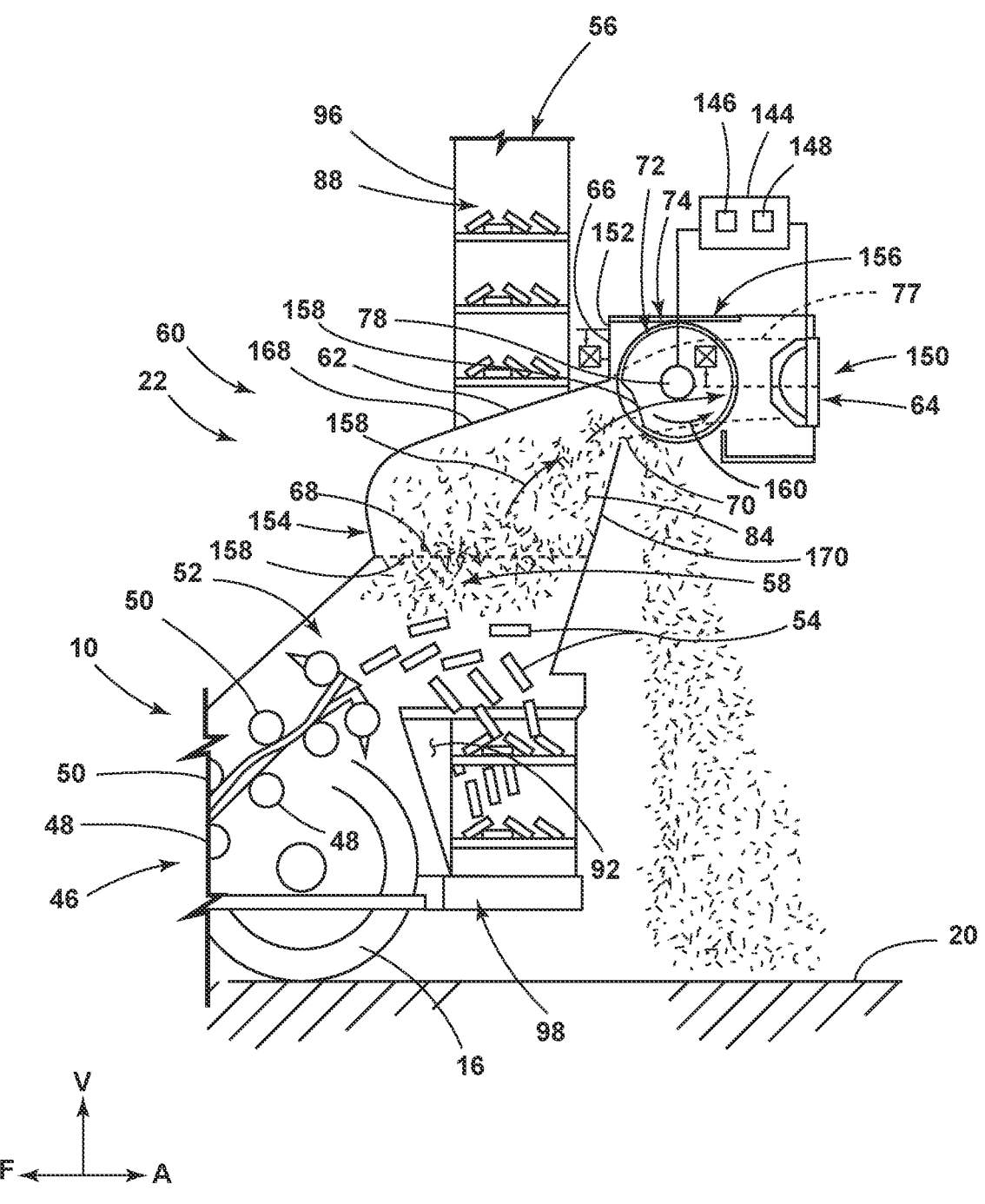
FIG. 9A is a schematic view of the debris removal system incorporated within a primary extractor in accordance with aspects of the present subject matter.
Figure 9B:
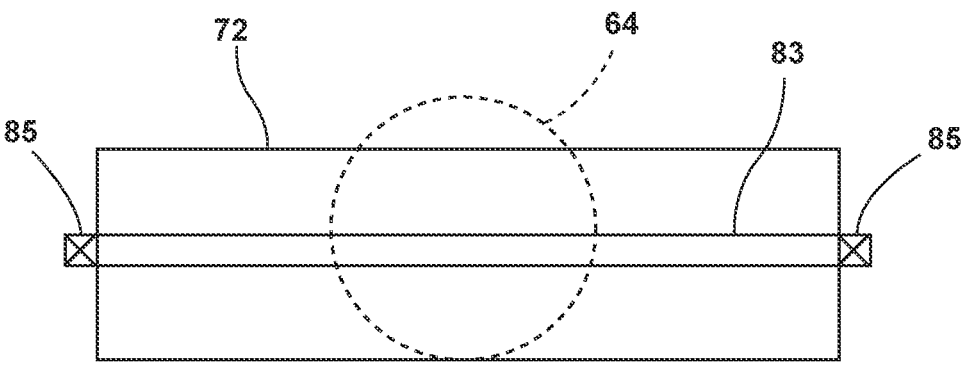
FIG. 9B is a cross-section view taken along the line IXB-IXB of FIG. 9A.
Figure 9C:
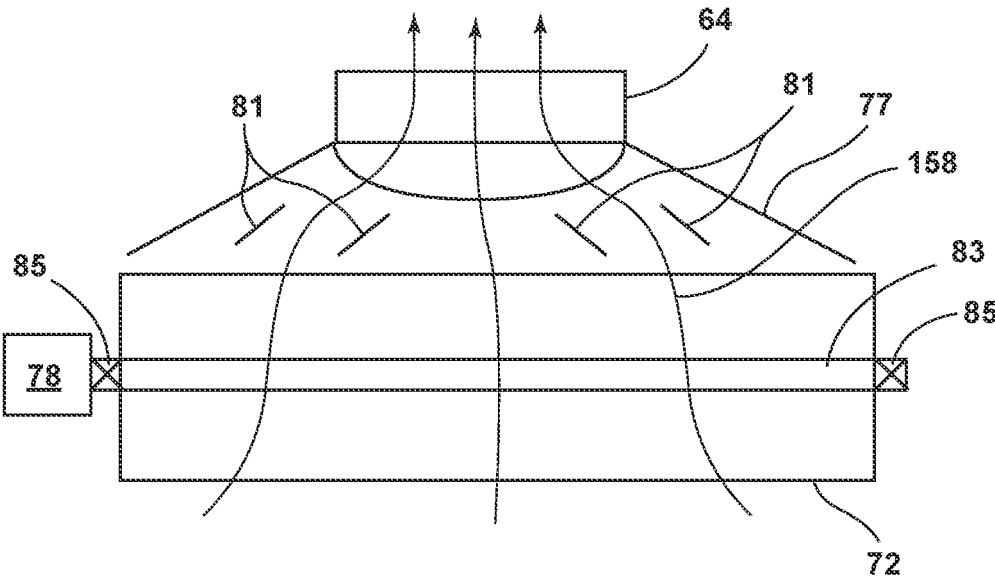
FIG. 9C is a cross-section view taken along the line IXC-IXC of FIG. 9A.
Figure 10:
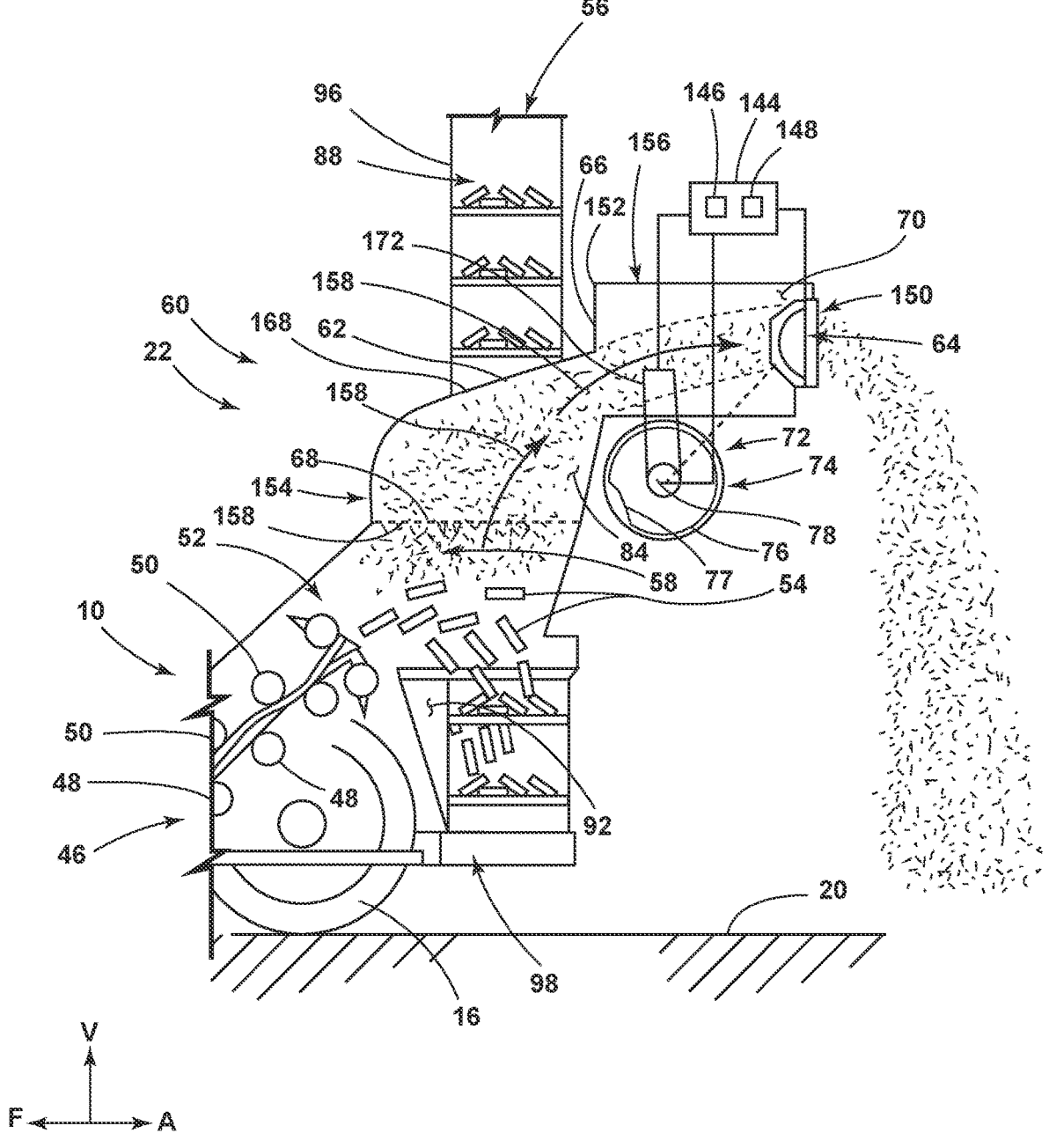
FIG. 10 is a schematic view of the debris removal system incorporated within a primary extractor in accordance with aspects of the present subject matter.

Referring to FIGS. 9A-9C, the airflow device 64 may operably coupled with duct 77 that may be positioned rearward (or at least partially rearwardly) of the drum 72. Moreover, the duct 77 may include one or more vanes 81 that may be configured to distribute the airflow through the duct 77 to various sections thereof, which may in turn assists in avoiding preferential flow (e.g., may assist in reducing the nearest section of the duct 77 to the airflow device 64 from having the greatest suction and so on).

Referring now to FIGS. 9A-12, in several examples, the extractor 62 may include an extractor housing 66 extending from a housing inlet 68 and a housing outlet 70. The housing 66 may further include a duct 150 to direct airflow generated by the airflow device 64 therethrough. As shown in FIGS. 9A-12, the extractor housing 66 may include an exterior housing wall 152 that defines an airflow channel 84 between the housing inlet 68 and housing outlet 70 for directing the debris 58 through the housing 66 for subsequent discharge from the extractor 62 via the housing outlet 70. As illustrated, the first section 154 of the housing 66 may define a lower section having a first width in a fore-aft direction F-A and an upper section having a second width in the fore-aft direction F-A. In some examples, such as the ones illustrated in FIGS. 9A-10, the second width may be less than the first width. However, it will be appreciated that the first width may be less than or equal to the second width without departing from the scope of the present disclosure.

In the examples illustrated in FIGS. 9A-12, the drum 72 may be at least partially positioned within the second section 156 of the housing 66. In some instances, an upper wall portion 168 of the first section 154 may be positioned a first distance from the drum 72 while a lower wall portion 170 of the first section 154 may be positioned a second distance from the drum 72. As shown, the second distance may be greater than the first distance such that an area defined between the drum 72 and the lower wall portion 170 forms the housing outlet 70 for the debris 58 to be discharged from the extractor 62.

As illustrated in FIGS. 9A-12, the motor 78 configured to drive the drum 72 may be operably coupled with a drum actuator 172 that is configured to move the drum 72 between a first position, which may be at least partially within the housing 66, to a second position, which may be at least partially external of the housing 66. In several examples, the drum actuator 172 can be configured as an electric actuator, a hydraulic actuator, and/or any other practicable type of actuator without departing from the teachings provided herein.

For example, as shown in FIGS. 9A-12, in operation, the airflow device 64 may generate a suction or vacuum through the housing 66 thereby creating an airflow path, as generally indicated by arrows 158. When the drum 72 is in the first position, the debris 58 directed through the extractor housing 66 may flow upwardly from the housing inlet 68 through the airflow channel 84 defined by the first section 154 of the housing 66 and contact the drum 72. The drum 72, which may be rotated by the motor 78 in the direction of arrow 160, may direct the debris 58 to a position proximate to the housing outlet 70, such as rearwardly of at least a portion of the elevator assembly 56 and/or the hopper 92. When the deflector 76 alters the airflow through the drum 72, the debris 58 may be released from the drum 72 and discharged from the harvester 10 through the housing outlet 70. When the drum 72 is in the second position, the debris 58 directed through the extractor housing 66 may flow upwardly from the housing inlet 68 through the airflow channel 84 defined by the first section 154 of the housing 66. In turn, the debris 58 may be directed through the passage 150 of the housing 66. In such cases, the debris 58 may go "intact" through the airflow device 64 and/or be shredded (e.g., using counter knives on the housing of the rotor) as it passes through the airflow device 64.

Figure 11:
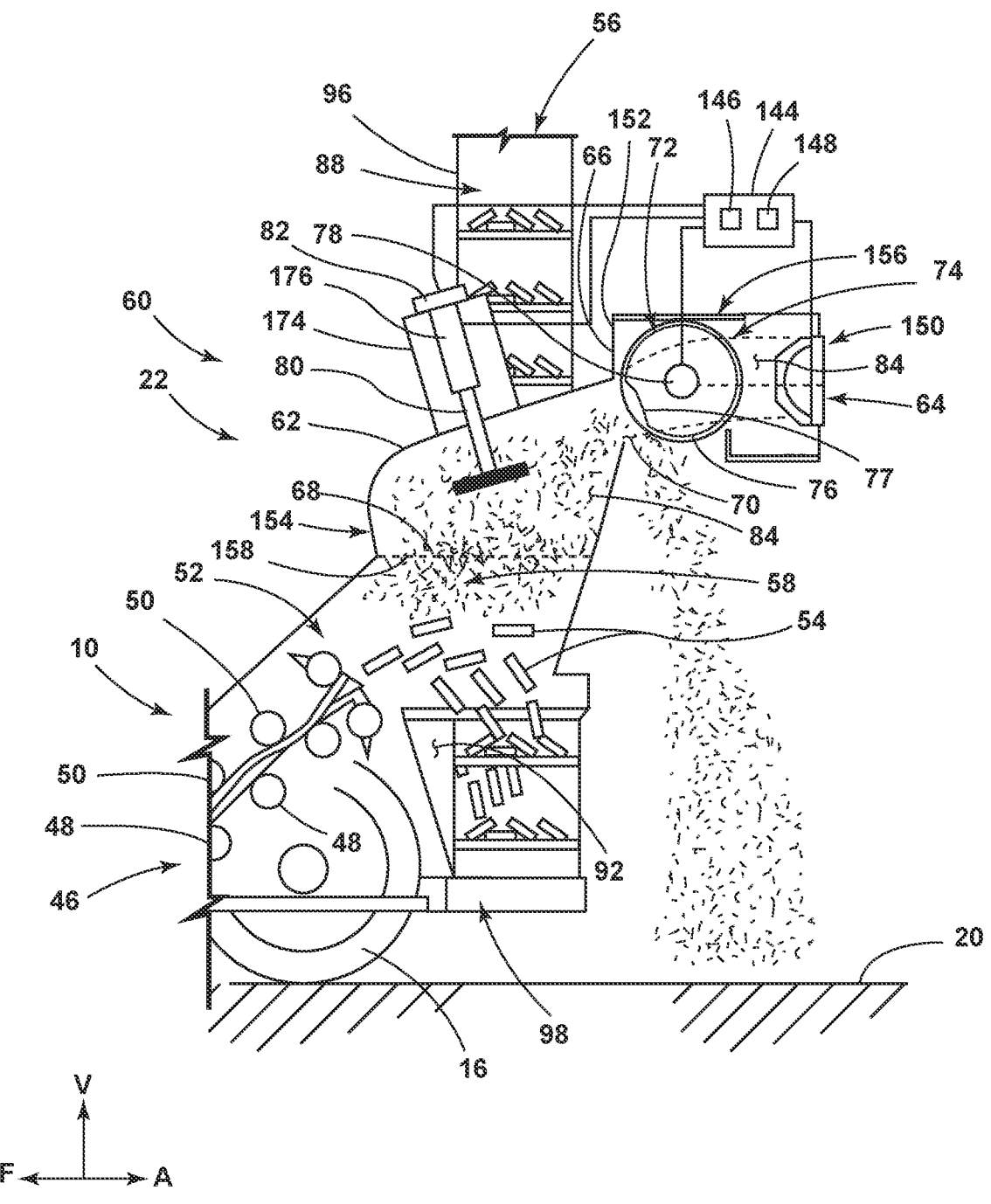
FIG. 11 is a schematic view of the debris removal system incorporated within a primary extractor in accordance with aspects of the present subject matter.
Figure 12:
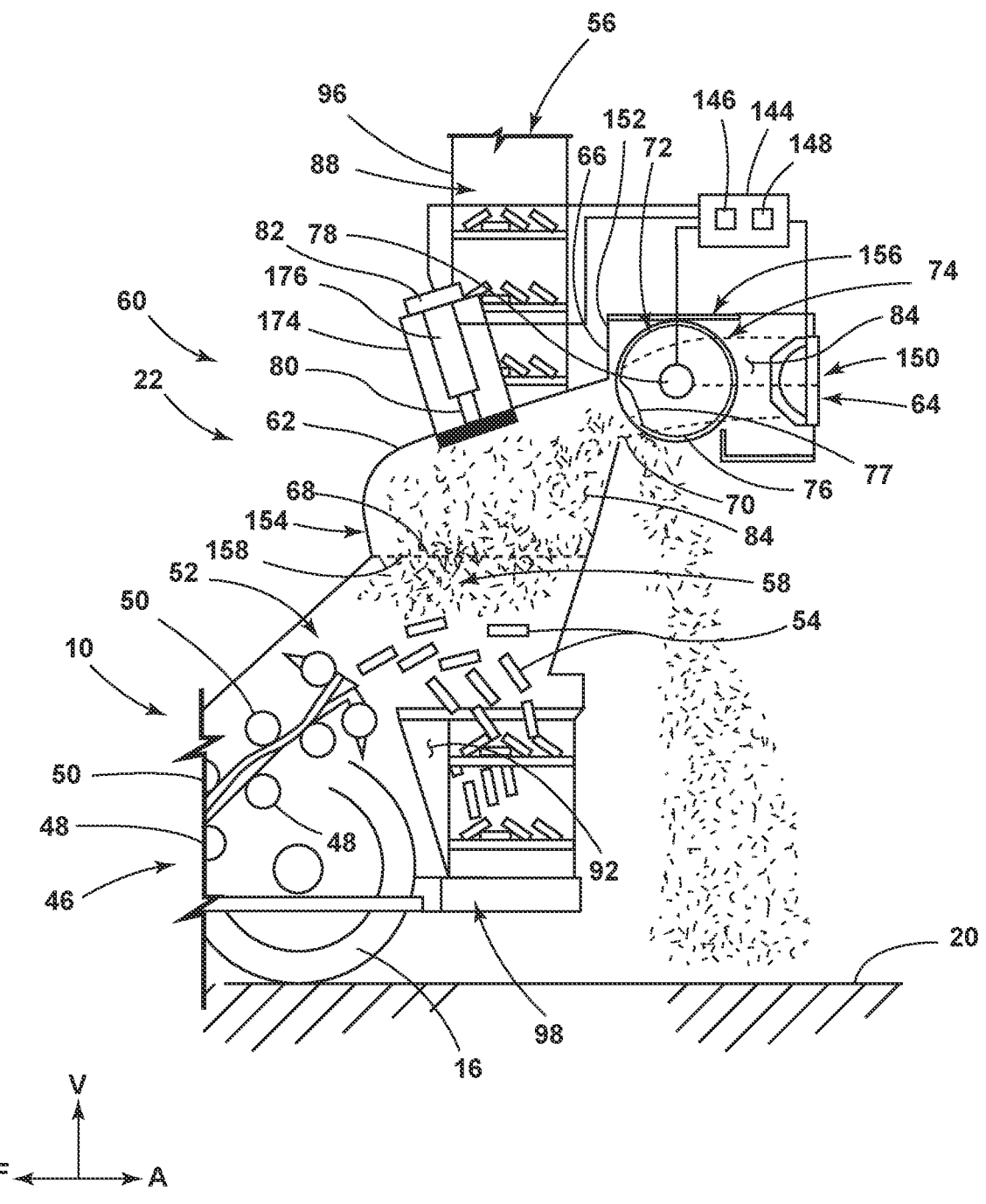
FIG. 12 is a schematic view of the debris removal system incorporated within a primary extractor in accordance with aspects of the present subject matter.

With further reference to FIGS. 11 and 12, a material shredder 80 can be selectively positioned within the housing 66. In various examples, the material shredder 80 may be driven using a power source 82, such as an electric or hydraulic motor. Moreover, the material shredder 80 may be at least partially housed within a shredder casing 174 operably coupled with the housing 66, and/or integrally formed with the housing 66. The material shredder 80 may be selectively extended into the airflow channel 84 between the housing inlet 68 and housing outlet 70 by a shredder actuator 176. In several examples, the shredder actuator 176 can be configured as an electric actuator, a hydraulic actuator, and/or any other practicable type of actuator without departing from the teachings provided herein.

During the operation of the primary extractor 62, the airflow device 64 can draw the debris 58 toward the housing inlet 68 and the optional material shredder 80, when in the first position as illustrated in FIG. 11, shred and chop the debris 58 into smaller pieces. In turn, the debris 58 is drawn towards the drum 72 and/or the airflow device 64 by the suction force or vacuum of the airflow device 64 to force the debris 58 to contact and rotate with the drum 72 and/or be directed through the passage 150 of the housing 66. Alternatively, during the operation of the primary extractor 62, the airflow device 64 can draw the debris 58 toward the housing inlet 68 and past the optional material shredder 80, when in a second position as illustrated in FIG. 12. In turn, the debris 58 is drawn towards the drum 72 and/or the airflow device 64 by the suction force or vacuum of the airflow device 64 to force the debris 58 to contact and rotate with the drum 72 and/or be directed through the passage 150 of the housing 66 to a position at least partially rearwardly of the elevator assembly 56 and/or the hopper 92. In various examples, the movement of the drum 72 and/or the shredder 80 may be based on various conditions. For instance, in some cases, the use of the shredder 80 and/or the drum 72 may be based on the amount of debris 58 and/or the detected content of the debris 58. However, it will be appreciated that the use of the shredder 80 and/or the drum 72 may be based on any other condition without departing from the teachings provided herein.

Referring now to FIG. 13, a flow diagram of a method 200 for operating a debris removal system for an agricultural harvester is illustrated in accordance with aspects of the present subject matter. In general, the method 200 will be described herein with reference to the agricultural harvester 10 and related components described with reference to FIGS. 1-12. As such, the agricultural harvester can include a material processing system configured to receive a flow of harvested materials. However, it will be appreciated that the disclosed method 200 may be implemented with harvesters having any other suitable configurations and/or within systems having any other suitable system configuration. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 13, at (202), the method 200 can include generating an airflow through a channel defined by an extractor housing from a housing inlet defined by the extractor housing to a passage defined by the extractor housing with an airflow device.

At (204), the method 200 can include rotating a drum positioned at least partially within the extractor housing with a motor. At (206), the method 200 can include directing debris from the housing inlet to a housing outlet defined by the housing with the drum.

At (208), the method 200 can include directing the airflow generated by the airflow device through a duct positioned at least partially within the drum. In some instances, the duct can include one or more vanes within that may be actuatable to alter an amount of airflow through various portions of the duct. For instance, an end portion of one or more vanes may be rotatable about a pivot point to alter the airflow through the one or more portions.

At (210), the method 200 can include moving the drum vertically between a first position and a second position relative to the housing with a drum actuator. In some cases, at least a portion of the debris is exhausted through the passage of the housing when the drum is placed in the second position.

At (212), the method 200 can include rotating a shredder positioned between the housing inlet and the drum to chop the debris with a power source.

At (214), the method 200 can include moving the shredder between a first position and a second position relative to the housing with a shredder actuator. In various examples, the shredder can be at least partially within the channel when in the first position and at least partially external to the channel when in the second position.

In several examples, the movement of the drum and/or the shredder may be based on various conditions. For instance, in some cases, the operation of the airflow device, the shredder, and/or the drum may be based on the amount of debris and/or the detected content of the debris. However, it will be appreciated that the operation of the airflow device, the shredder, and/or the drum may be based on any other condition without departing from the teachings provided herein. In various examples, the method 200 may implement machine learning methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the operation of the airflow device, the shredder, the drum, and/or any other component of the debris removal system. In some instances, the machine learning engine may allow for changes to the operation of the airflow device, the shredder, the drum, and/or any other component of the debris removal system to be performed without human intervention.

It is to be understood that the steps of the method 200 are performed by the computing system upon loading and executing software code or instructions that are tangibly stored on a tangible computer-readable medium, such as on a magnetic medium, e.g., a computer hard drive, an optical medium, e.g., an optical disk, solid-state memory, e.g., flash memory, or other storage media known in the art. Thus, any of the functionality performed by the computing system described herein, such as the method 200, is implemented in software code or instructions that are tangibly stored on a tangible computer-readable medium. The computing system loads the software code or instructions via a direct interface with the computer-readable medium or via a wired and/or wireless network. Upon loading and executing such software code or instructions by the computing system, the computing system may perform any of the functionality of the computing system described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A debris removal system for an agricultural harvester, the debris removal system comprising:
   an extractor housing defining a housing inlet, a housing outlet, and a passage, the extractor housing further defining an airflow channel for directing debris through the extractor housing from the housing inlet to the housing outlet;
   an airflow device that generates an airflow from the housing inlet towards the airflow device, wherein the airflow separates the debris from billets of a crop material; and
   a drum positioned at least partially within the airflow channel, the drum positioned between the housing inlet and the passage, wherein the debris within the airflow channel is directed by the drum towards the housing outlet, and wherein a portion of the drum extends through the housing outlet.

2. The system of claim 1, further comprising:
   a deflector positioned at least partially within the drum, the deflector defining a duct, wherein the duct directs a path of the airflow therethrough.

3. The system of claim 1, further comprising:
   a motor operably coupled with the drum that rotates the drum relative to the housing.

4. The system of claim 1, wherein the housing inlet and the housing outlet are positioned vertically below at least a portion of the drum.

5. The system of claim 1, wherein the passage is positioned vertically above at least a portion of the drum.

6. The system of claim 1, further comprising:
   a debris processing assembly downstream of the drum.

7. The system of claim 6, wherein the debris processing assembly is a shredder that shreds the debris into smaller pieces.

8. The system of claim 6, wherein the debris processing assembly is a spreader that directs the debris exhausted through the housing outlet to cover a defined area.

9. The system of claim 1, further comprising:
   an actuator operably coupled with the drum that moves the drum vertically between a first position and a second position relative to the housing.

10. The system of claim 1, further comprising:
    a material shredder positioned between the housing inlet and the drum, the material shredder that moves between a first position and a second position relative to the housing.

11. A method for operating a debris removal system for an agricultural harvester, the agricultural harvester including a material processing system that receives a flow of harvested materials, the method comprising:
    generating, with an airflow device, an airflow through a channel defined by an extractor housing from a housing inlet defined by the extractor housing to a passage defined by the extractor housing;
    rotating, with a motor, a drum positioned at least partially within the extractor housing;
    moving, with a drum actuator, the drum vertically between a first position and a second position relative to the housing; and
    directing, with the drum, debris from the housing inlet to a housing outlet defined by the housing.

12. The method of claim 11, further comprising:
    directing the airflow generated by the airflow device through a duct positioned at least partially within the drum.

13. The method of claim 11, further comprising:
    rotating, with a power source, a shredder positioned between the housing inlet and the drum to chop the debris.

14. The method of claim 13, further comprising:
    moving, with a shredder actuator, the shredder vertically between a first position and a second position relative to the housing, wherein the shredder is at least partially within the channel when in the first position.

15. A debris removal system for an agricultural harvester, the debris removal system comprising:
    an extractor housing defining a housing inlet, a housing outlet, and a passage, the extractor housing further defining an airflow channel for directing debris through the extractor housing from the housing inlet to the housing outlet;
    an airflow device that generates an airflow from the housing inlet towards the airflow device, the airflow that separates the debris from billets of a crop material;
    a drum positioned at least partially within the airflow channel, the drum positioned between the housing inlet and the passage, wherein the debris within the airflow channel is directed by the drum toward the housing outlet; and an actuator operably coupled with the drum, the actuator moves the drum vertically between a first position and a second position relative to the housing.

16. The system of claim 15, wherein an angle between the housing inlet and the housing outlet is less than 180 degrees relative to an axis of rotation of the drum.

17. The system of claim 15, wherein a portion of the debris is exhausted through the passage when the drum is in the second position.

18. The system of claim 15, further comprising:

a material shredder positioned between the housing inlet and the drum, the material shredder moves between a first position and a second position relative to the housing.

* * * * *